United States Patent [19]

Becker et al.

[11] Patent Number: 4,662,265

[45] Date of Patent: May 5, 1987

[54] ARRANGEMENT FOR HORIZONTALLY ORIENTING A ROTATABLE PLATFORM FOR A WEAPON

[75] Inventors: Wilfried Becker, Duesseldorf; Klaus-Dieter Pahnke, Hilden, both of Fed. Rep. of Germany

[73] Assignee: Rheinmetall GmbH, Duesseldorf, Fed. Rep. of Germany

[21] Appl. No.: 578,057

[22] Filed: Feb. 8, 1984

[30] Foreign Application Priority Data

Mar. 1, 1983 [DE] Fed. Rep. of Germany ....... 3307069

[51] Int. Cl.⁴ ..................... F41D 11/24; F16M 11/12
[52] U.S. Cl. ................................. 89/37.09; 89/41.02; 33/390; 248/179
[58] Field of Search .................. 33/390, 374, 385, 375, 33/333, 334, 235, 347; 248/179, 178, 542; 89/37.09, 41.02, 41.01, 40.01

[56] References Cited

U.S. PATENT DOCUMENTS

| | | | |
|---|---|---|---|
| 2,723,821 | 11/1955 | Kelly et al. | 248/179 |
| 2,903,945 | 9/1959 | Mann | 89/41.02 |
| 3,026,625 | 3/1962 | Carey, Sr. | 33/390 |
| 4,223,591 | 9/1980 | Croissant, Jr. | 89/37.19 |
| 4,273,026 | 6/1981 | Walter | 89/37.19 X |
| 4,318,522 | 3/1982 | Appleberry | 248/178 |

FOREIGN PATENT DOCUMENTS 977592 8/1962 Fed. Rep. of Germany .

Primary Examiner—John F. Terapane
Assistant Examiner—John S. Maples

[57] ABSTRACT

An arrangement for horizontally orienting a rotatable weapon support platform. The arrangement has a base surface (generally the roof or fuselage of an armored vehicle) and a pair of cylindrical members rotatably mounted thereon, on the top one of which the weapon support platform is rotatably mounted. The bottom cylindrical member is rotatably mounted on the base surface. The latter surface is generally sloped and canted and the arrangement serves to compensate for the slope and cant and horizontally orients the weapon support platform.

The top and bottom members each have one end surface which is normal to the longitudinal axis thereof and one end surface which is skewed with respect to the longitudinal axis. The respective skewed end surfaces mutually confront each other and are parallel to each other.

The horizontation process is effected by joint rotation of the top and bottom members about the vertical axis of the armored vehicle and thereafter a rotation of the top and bottom members in mutually opposite directions.

8 Claims, 11 Drawing Figures

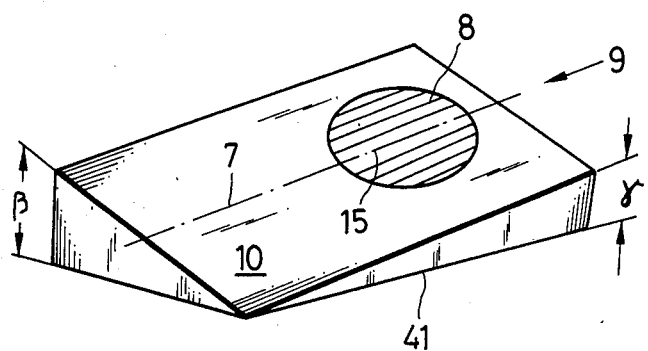
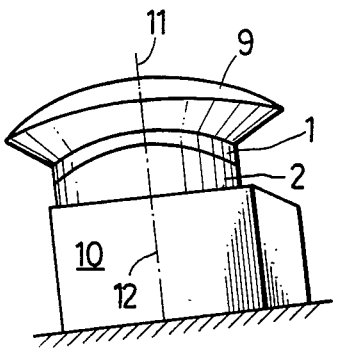
FIG.6    FIG.9
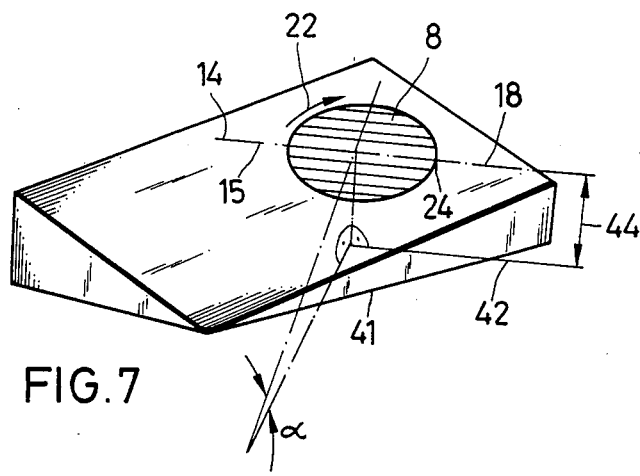
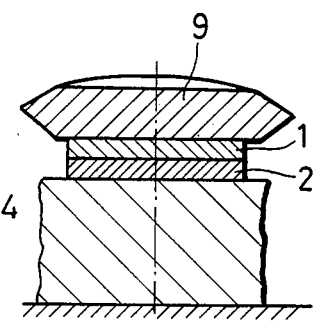
FIG.7    FIG.10
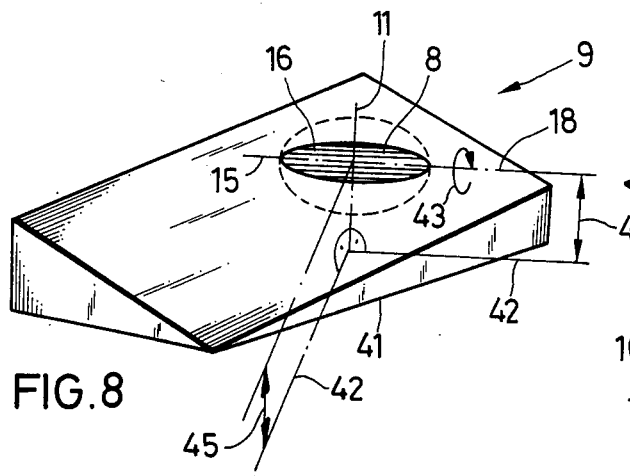
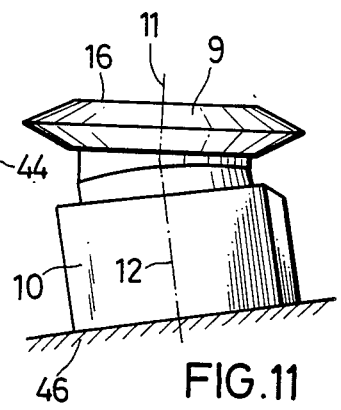
FIG.8    FIG.11

4,662,265

ARRANGEMENT FOR HORIZONTALLY ORIENTING A ROTATABLE PLATFORM FOR A WEAPON

BACKGROUND OF THE INVENTION

With those weapon systems which are adjustable to a steep firing angle, such as howitzers anti-aircraft cannons, mortars etc., there frequently occur misalignments and jammings with movable gun carriages, which inhibit the target impact accuracy and firing adjustment of the weapon. Known weapon systems, whose position is horizontally oriented (aimed) about two adjusting axes, are not suitable, for example, for a cardanic (universal joint) horizontal orienting, whereby high forces have to be transmitted via a ball bearing support. The arrangement of such a weapon, in addition to a large required constructional volume, can only be stabilized and horizontally oriented (aimed) with difficulty and complexity.

In German Pat. No. 977 592 there is disclosed an arrangement for stabilizing a cannon mounted on a movable platform about a plurality of axes. However, with this arrangement each adjustment of the weapon in a lateral direction requires the platform to be horizontally oriented anew. A highly technical complex imput is required for the purpose of realizing a constant horizontal position of the platform.

SUMMARY OF THE INVENTION

It is an object of this invention to provide a simple, stable and compact arrangement for horizontally orienting (aiming) a rotatable weapon's platform. Such an arrangement is capable of requiring only one automatic or manual compensation relative to the horizontal plane without complex adjusting and controlling mechanisms to achieve a stable position. Such arrangement is preferably mounted on a vehicle. The arrangement of the invention provides a stable weapon support without requiring a swinging compensation and it is randomly adjustable about a lateral adjusting axis.

BRIEF DESCRIPTION OF THE DRAWINGS

These and other objects, features and advantages of the present invention, will become more obvious from the following description, when taken in connection with the accompanying drawings, in which:

FIG. 6 is a schematic illustration of the upper side of the arrangment for horizontally orienting and the supporting surface of a spatially skewed base, on which the upper side of the weapon arrangement assumes the locked position;

FIG. 7 is a schematic illustration similar to FIG. 6 in which the upper side of the weapon arrangement is horizontally oriented along one axis relative to FIG. 6;

FIG. 8 is an illustration similar to FIGS. 6 and 7 in which the upper side of the weapon arrangement has been swung into a horizontal position about the horizontally oriented axis relative to FIG. 7;

FIG. 9 is a schematic side elevational illustration of the arrangement along the arrow 9 of FIG. 6 in which the arrangement for horizontally orienting and the weapon's support platform is shown in the locked position on a canted and sloped base;

FIG. 10 is a simplified cross-sectional view along the plane 10—10 of FIG. 4 in which the weapon support platform and the arrangement for horizontally orienting have been horizontally oriented along one axis; and FIG. 11 is a schematic side elevational view along the arrow 11 in FIG. 8 illustrating the weapon support platform in a horizontally oriented position on a canted and sloped base.

DETAILED DESCRIPTION

Figure 1:
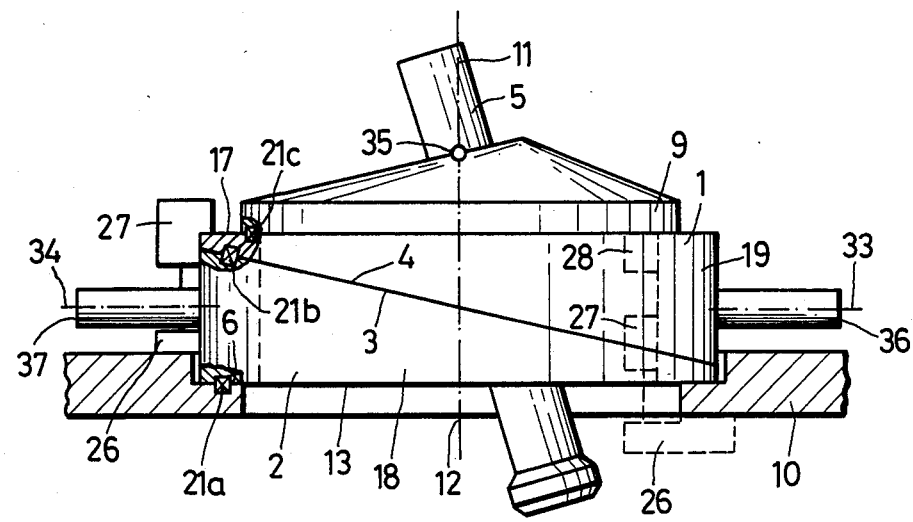
FIG. 1 is a partial cross-sectional side elevational view of the roof of a vehicle on which there is mounted an arrangement for horizontally orienting a weapon support platform mounted on the vehicle.
Figure 2:
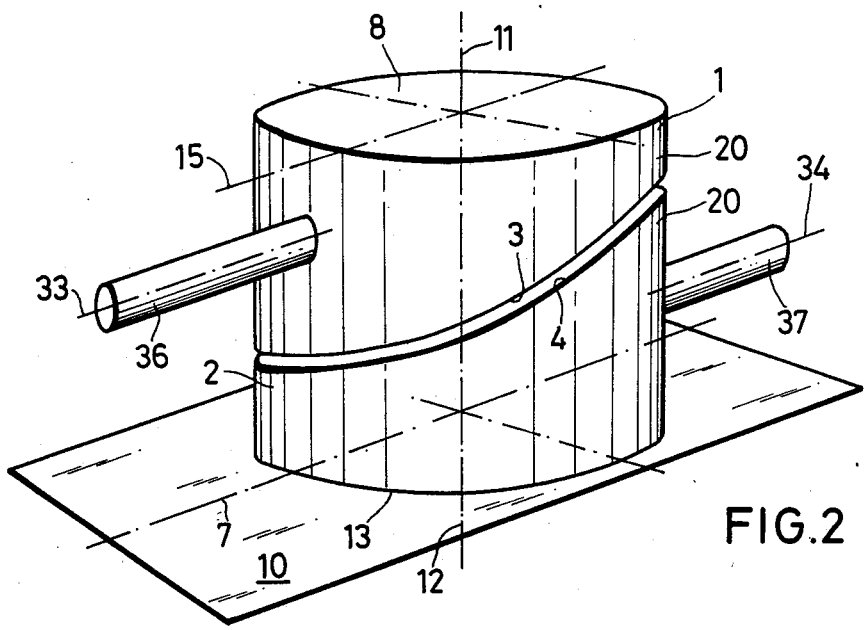
FIG. 2 is a simplified perspective view of the arrangement for horizontally orienting, in which view the weapon support platform is not illustrated; two massive scewed cylindrical discs are illustrated schematically and are shown mounted on a vehicle roof.
Figure 3:
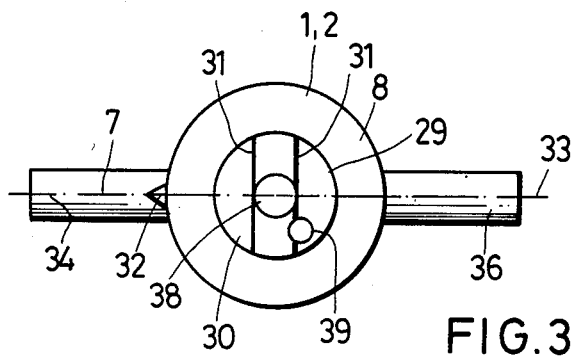
FIG. 3 is a plane view of a portion of the arrangement of FIG. 2 in locked position, showing also the platform fixing means which is arranged in the weapon for positioning.

FIG. 1 illustrates a vehicle fuselage, respectively vehicle roof 10, which serves as a support base and supports bodies 1, 2 so as to form an arrangement for horizontally orienting a rotatable platform 9. The bodies 1, 2 of the arrangement are ring-shaped so as to form hollow cylindrical discs 19 having mutually confronting skewed end surfaces 3, 4, which are mutually parallel and form skewed surfaces relative to a bottom 13 of the body 2, which bottom is mounted on the vehicle roof or fuselage 10. The upper side 8 of the body 1, which serves as supporting surface 17 for rotatably supporting the weapon support platform 9, as will be described hereinafter in greater detail in connection with FIGS. 2 and 3, is shown in a locked position. The body 2 has a bottom surface which is parallel to the bottom 13 of the body 2. There are provided bearings 21 for providing mobility, between the bottom 13 of the body 2 and a support surface 6 of the vehicle fuselage 10, between the side surfaces 3 and 4 of the bodies 1 and 2, and between the rotatable weapon support platform 9 and the top surface 8. In this way the bodies 1 and 2 are capable of being jointly rotated about the vehicle vertical axis 12 during the horizontally orientation process by means of the bearings 21a. Immediately thereafter they can be rotated in mutually opposite directions 23 (FIG. 5) via the bearings 21a and 21b by rotating both bodies 1, 2 to horizontally orientate the weapon support platform 9. For the purpose of either maintaining during this adjusting process a weapon 5, mounted on the weapon support platform 9, on a trunnion bearing 35 on which it is swingably mounted in its locked position, or with a horizontally oriented weapon support platform 9 in any preselected position about the lateral adjustment axis 11, there is disposed a further bearing 21c between the receiving surface 17 of the body 1 and the weapon support platform 9. A lateral motorized adjusting drive 28, preferably mounted on the weapon support platform 9, which is in engagement with the body 1, but during the rotational movement of the body 1 is disconnected therefrom, adjusts the weapon support platform 9 in the predetermined lateral direction for the weapon 5 by rotation about the axis 11. The rotational movements of the bodies 1 and 2 can simply be also carried out manually by rotating the levers 36, 37, respectively by means of a non-illustrated motor. The levers 36, 37 are coaxial with respect to the body axes 33, 34. Rotation can also be effected by means of a drive 26, mounted on the vehicle fuselage, respectively vehicle roof 10, the inner side or outer side of the body 1 is respectively frictionally driven by means of an internal drive 27a or an external drive 27 which is in contact with the body 1. The construction of the drive 26 can take various forms; for example, it can be a non-illustrated worm drive, which is in meshing engagement with a gear wheel (non-illustrated) mounted on the body 2. Similarly the drive 27 for the body 1 can take various forms, for example it can take the form of a non-illustrated switching or clutch drive arranged in parallel to the vehicle longitudinal axis 12, which is slidably displaceable with the drive 26, so that a joint rotational movement of the bodies 1, 2 in the direction 22 (FIG. 4) can be effected in locked condition or synchronously, or when opposite rotational movement occurs (FIG. 5) it engages in such a way between the bodies 1 and 2 that the bodies 1 and 2 either move synchronously or are uniformly jointly rotated in mutual opposite directions 23 (FIG. 5).

In FIG. 2 there is schematically illustrated the bodies 1, 2 of the arrangement for horizontally orienting. The bodies 1, 2 are simple, massive and skewed at one side to form cylindrical adjoining discs 20, whereby the upper surface 8 of the upper cylindrical disc 20 can, for example, be rotated by means of a short manual rotation of the levers 36, 37 first in the same direction (FIG. 4) and thereafter in the opposite direction (FIG. 5) relative to a sloped plane of a vehicle having the vehicle fuselage, respectively vehicle roof 10 on which the horizontal orientation occurs. The bodies 1, 2 are in that position in which the weapon 5 is clampingly held, that is the longitudinal axis 15 and the body axes 33, 34 extend parallelly with respect to the longitudinal axis 7 of the vehicle, whereby the upper side 8 of the body 1 and the surface of the bottom 13 of the body 2 form parallel surfaces.

In such clamped position the axis which is perpendicular to the upper surface 8 of the body 1 and the lateral adjusting axis 11 of the weapon support platform 9 illustrated in FIG. 1 intersect with the turret axis 12 which is perpendicular on the support surface 6 (FIG. 1) of the vehicle fuselage, respectively vehicle roof 10, so that all of these axes form a straight line. The skewed end surfaces 3, 4 are arranged so as to slope upwardly in the direction of the longitudinal axis 7 of the vehicle from front to rear, whereby a downwardly sloping arrangement from the front to its rear would also be practical. The upper side 8 of the body 1 forms not only the supporting surface 17 (FIG. 1) for a weapon support platform 9, but simultaneously also forms a reference surface for an inclinometer member 29 illustrated in FIGS. 3-5.

The construction of a support, for example a dosing clinometer 30 and the arrangement on the upper side 8 of the body 1 are illustrated in FIG. 3. The clinometer 30 is provided with two parallelly markings 31 which, in a clamped position of the weapon 5 (FIG. 1) are arranged transversely with respect to the longitudinal axis 7 of the vehicle. The dosing clinometer 30 has in its center a circularly shaped marking 38, which, in case of a horizontal position of the clinometer 30, and thereby also the weapon support platform 9 (FIG. 1), surrounds concentrically the gas bubble 39. The bodies 1, 2 are adjusted, when the weapon 5 is in the clamped position (FIG. 1), whereby the body axes 33, 34 extend parallel to the longitudinal vehicle axis 7 in the same direction. For better assumption and control of the clamping position the bodies 1, 2 are provded with markings 32 so as to correctly positioned relative to the weapon support platform 9 (FIG. 1) and the vehicle fuselage, respectively vehicle roof 10 (FIG. 1). Prior to horizontal orientation the gas bubble 39 is disposed outside of the markings 31, 38, whereby a sloping in the inclined position according to FIG. 6 of the upper side 8 is indicated by the clinometer.

Figure 4:
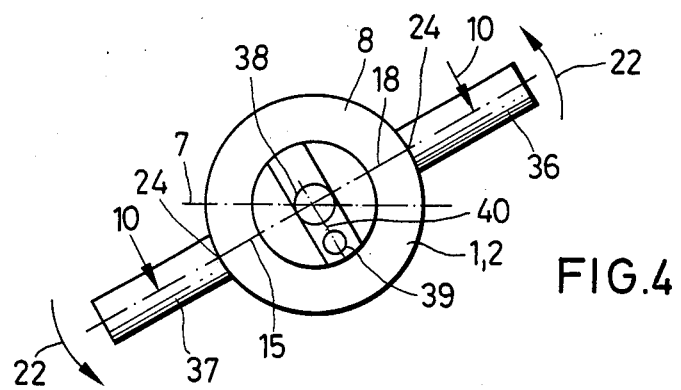
FIG. 4 is the arrangement according to FIG. 3 in a different position in which the fixing means for positioning indicate a horizontal position of one axis of the arrangement.
Figure 5:
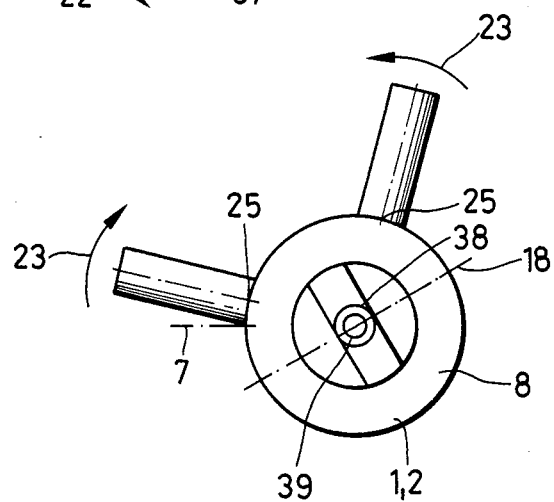
FIG. 5 is an illustration of the arrangement of FIG. 3 in which the position fixing means indicate the horizontal position of the upper side of the arrangement.

The manner in which the upper side 8 and thereby the weapon support platform 9 (FIG. 1) is, for example, horizontally oriented in a simple manner by means of a motor or manually with the aid of the dosing clinometer 30, is explained in detail in conjunction with FIGS. 4 and 5. Both bodies 1, 2 are rotated with equal angular velocity in the direction 22 about the vehicle longitudinal axis 12 by the drive 26 (FIG. 1) or manually by means of the levers 36, 37 so long until the connection line 40 of the middle point of the gas bubble and the marking 38 assume a parallel position with respect to the markings 31 (FIG. 4). In such position 24, the longitudinal axis 15 of the upper side 8 jointly with the swing axis 18 assume a horizontal position 14 (FIG. 7). The weapon 5 (FIG. 1) is still in the clamped position, while the bodies 1, 2 assume the position 24. Both bodies 1, 2 are now simultaneously and uniformly rotated, counter to each other, from the position 24 in the direction 23 (FIG. 5), until the gas bubble 39 is concentrically surrounded by the marking 38 (FIG. 5), whereby the bodies 1, 2 while assuming the position 25 (FIG. 5) causes swinging of the platform 9 (FIG. 1) about the swing axis 18 into a horizontal position 16 (FIG. 8). For the purpose of producing a motor-driven mutual opposite rotational movement in the direction 23 it is required to release the synchronous movement of the body 1 relative to the body 2 by means of the drive 27 (FIG. 1). In the horizontal position 16 (FIG. 8) of the upper side 8 the weapon 5 arranged on the weapon platform 9 (FIG. 1) can be unlocked and aimed.

The FIGS. 6, 7 and 8 illustrate schematically the horizontal orientation process of the upper side 8 of the body 1 (FIG. 3), which in the clamped position (FIG. 6) assumes, with its longitudinal axis 15 in the direction of the longitudinal axis 7 of the vehicle, a parallel position relative to a horizontal plane 41. This plane 41 is sloped at an angle $\beta$ and an angle $\gamma$ in a hang position relative to an inclined fuselage respectively roof 10.

In FIG. 7 the upper surface 8 is dispoed in the position 24, in which by means of the joint rotation of the bodies 1, 2 (FIG. 4), it has been oriented in the direction 22 under the inclination angle $\alpha$ and its longitudinal axis 15 and a swing axis 18 assume a horizontal position 14. While in FIG. 7 only the swing axis 18 assumes a parallel distance 44 relative to a coordinate 42 of the horizontal plane 41, there is clearly illustrated in FIG. 8 the now completely horizontally oriented position 16 of the upper surface 8, whereby by means of the mutually opposite uniform and simultaneously rotational movements 23 (FIG. 5) of the bodies 1, 2 (FIG. 5) the upper surface 8 is swung in the direction 43 (FIG. 8) about the swing axis 18 and thereby also the lateral axis of the longitudinal axis 15 assumes a parallel distance 45 relative to a further coordinate 42 of the horizontal plane, so that the lateral orientation axis 11 assumes its required vertical position which is necessary for the aiming and leveling process.

FIGS. 9, 10 and 11 illustrate schematically the various positions of the base 10 when in a sloped condition and hang position, on which the arrangement formed by the bodies 1 and 2 horizontally orient the weapon platform 9. In FIG. 9 it can be seen that the weapon support platform 9 assumes the clamped position in which position the vehicle elevation axis 12 and side orientation axis 11 coincide, whereas in FIG. 10 the weapon support platform 9 is only horizontally oriented on the swing axis 18 (FIG. 7) and in FIG. 11 the horizontal position 16 of the weapon support platform 9 is reached. There is clearly illustrated in FIG. 11 that the vehicle elevation axis 12 remains unchanged in its perpendicular position relative to the inclined hang surface 46, whereas the side orientation axis 11 assumes the vertical position by means of the arrangement for horizontally orienting the weapon platform 9.

The arrangement of the invention distinguishes itself advantageously in that the horizontal process of the weapon platform is simple and rapid and requires a reduced mechanical constructional imput and a reduced number of constructional elements, in particular in so far as the movable parts are concerned. By providing a stable and rugged construction the invention is suitable in particular for transferring large forces. The arrangement of the weapon platform makes it possible to manually or by means of a motor drive to swing the weapon into the firing direction in an advantageous manner, whereby the slope compensation is only required once for each firing and thereby the weapon can be aimed randomly. A further substantial advantage resides in that the arrangement for horizontation is devoid of any electronic or complex technical mechanisms and complex control elements. The arrangement of the invention can in an advantageous manner be embodied in the form of a ring on a vehicle roof, whereby a space saving passage for a turret basket for the weapon and for the person manning the weaon is provided in a simple manner and an CBR-chemical-biological-radiation-protection is made possible.

Although the invention is described and illustrated with reference to a preferred embodiment thereof, it is to be expressly understood that it is in no way limited to the disclosure of such preferred embodiment but is capable of numerous modifications within the scope of the appended claims.

We claim:

1. An improved arrangement for horizontally orienting a rotatable weapon support platform, which arrangement has a base surface and adjustable means and support means disposed between said base surface and said platform for compensating for the sloping, if any, of said base surface, the improvement comprising in combination,
    a pair of members having parallel confronting surfaces, the bottom member of said pair of members being rotatably mounted on said base surface and the top member of said pair of members being rotatably mounted on the bottom member so that the bottom and top members are rotatable relative to each other;
    said top member having a first top surface on which said weapon support platform is rotatably mounted,
    said first top surface being capable to be oriented horizontally by rotating said top and bottom member relative to each other and relative to said base and weapon support platform,
    said top and bottom members having respective longitudinal axes along their respective top and bottom surfaces,
    said top and bottom members are formed as either hollow cylindrical discs or massive cyindrical integral members and each member has one end face which is parallel relative to the longitudinal axis of the member and one end face which is skewed relative to the longitudinal axis of the member.
    said base surface forming part of the fuselage or roof of an armored vehicle which base surface has a longitudinal axis, and a first swing axis of said weapon support platform and the longitudinal axis of the top surface of said top member assume a common predetermined horizontal position after the top and bottom members have been rotated in a common direction into a predetermined first position,
    and after said top and bottom member have been simultaneously uniformly rotated in mutually opposite directions into a predetermined second position, said weapon support platform is thereby swung about the longitudinal axis of the top surface of the top member to assume a horizontal position.

2. The improvement in an arrangement for horizontally orienting a rotatable weapon support platform as set forth in claim 1, wherein roller bearing means are operatively mounted between the skewed confronting surfaces of said pair of members, between said bottom member and said base, and between the top surface of said top member and the bottom of the weapon support platform.

3. The improvement in an arrangement for horizontally orienting a rotatable weapon support platform as set forth in claim 1, wherein said top and bottom members each have a second axis which extends normally through the longitudinal axis thereof, said second axes of the top and bottom members being parallel to the vertical axis of the vehicle, said weapon support platform having a second lateral swing axis which extends normally through said first swing axis, and said roof of the armored vehicle having a second vertical axis, said first lateral swing axis and said vertical axis of the roof of the armored vehicle forming a straight line when the weapon support platform is in a clamped inoperative position, and the first top surface being parallel to the base, said skewed end faces of said top and bottom members are upwardly or downwardly inclined with respect to the vertical axis of the vehicle.

4. The improvement in an arrangement for horizontally orienting a rotatable weapon support platform as set forth in claim 3, including first motor drive means operatively mounted on said roof of the armored vehicle and operatively connected to said bottom member for rotating it in a predetermined direction, and second motor drive means operatively mounted between said top and bottom members for rotating them jointly or synchronousy in the same direction or in mutually opposite directions.

5. The improvement in an arrangement for horizontally orienting a rotatable weapon support platform as set forth in claim 4, including third motor drive emeans operatively connected to the top member, which third motor drive means is disconnected from the top member when it is rotated by the first or second motor drive means, said third motor drive means being adapted to rotatably adjust the weapon support platform so as to aim the weapon mounted on the weapon support platform.

6. The improvement in an arrangement for horizontally orienting a rotatable weapon support platform as set forth in claim 5, wherein the top surface of the top member forms a reference surface for inclinometer mounted thereon.

7. The improvement in an arrangement for horizontally orienting a rotatable weapon support platform as set forth in claim 6, wherein said inclinometer has a first indicia means which is disposed transversely with respect to the longitudinal axis of the armored vehicle when the weapon is in a clamped condition.

8. The improvement in an arrangement for horizontally orienting a rotatable weapon support platform as set forth in claim 7, wherein said top and bottom members are provided with second indicia means which indicate their position relative to the weapon support platform and vehicle roof when the weapon is in a clamped condition.

* * * * *